April 12, 1966 — F. V. ENTERANTE — 3,245,430

COMBINATION PROPORTIONING, DIVERTER, AND SHUT-OFF VALVE

Original Filed Aug. 30, 1960 — 2 Sheets-Sheet 1

INVENTOR.
FRANK V. ENTERANTE
BY Lilly & Nyhagen
ATTORNEYS

April 12, 1966     F. V. ENTERANTE     3,245,430
COMBINATION PROPORTIONING, DIVERTER, AND SHUT-OFF VALVE
Original Filed Aug. 30, 1960     2 Sheets—Sheet 2
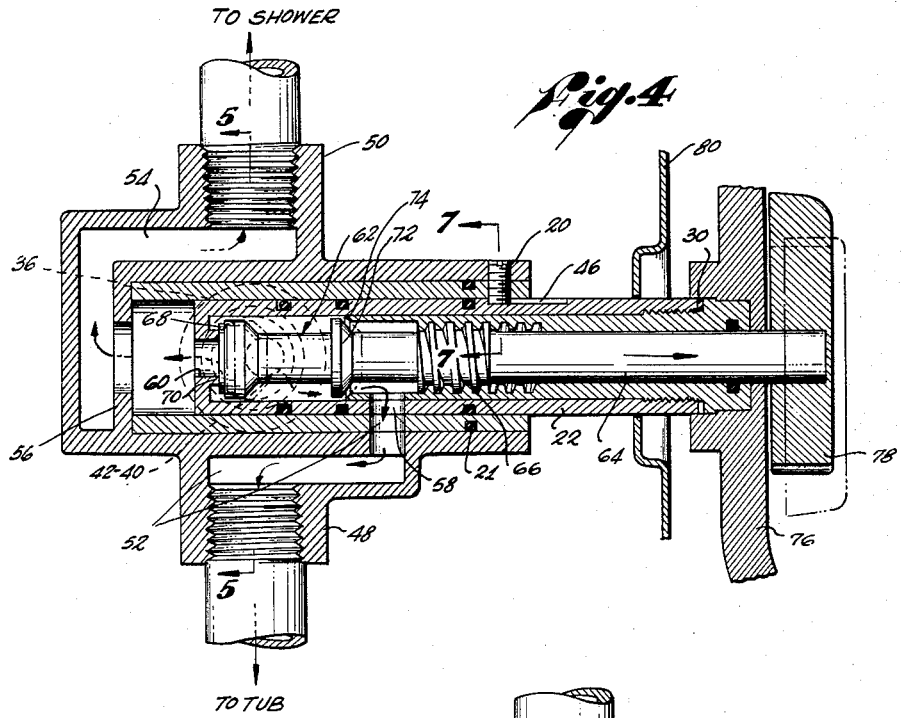
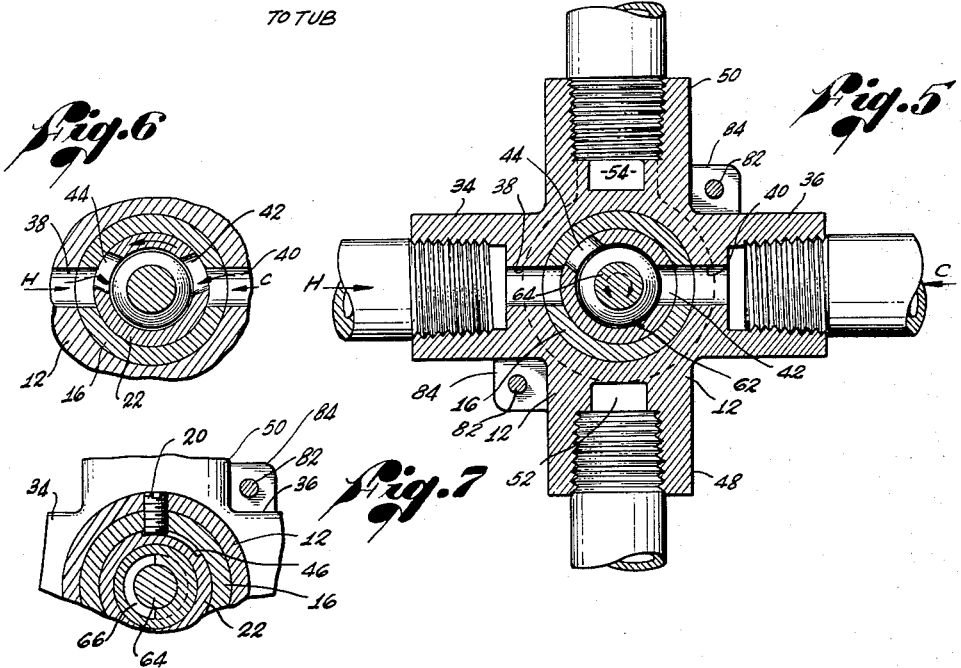
INVENTOR.
FRANK V. ENTERANTE
BY Lilly & Nyhagen
ATTORNEYS

United States Patent Office 3,245,430
Patented Apr. 12, 1966

3,245,430
COMBINATION PROPORTIONING, DIVERTER,
AND SHUT-OFF VALVE
Frank V. Enterante, Encino, Calif., assignor to Arrowhead Brass Products, Los Angeles, Calif., a partnership
Continuation of application Ser. No. 52,867, Aug. 30, 1960. This application Apr. 25, 1963, Ser. No. 275,777
8 Claims. (Cl. 137—637.4)

This invention relates generally to valves and particularly to an improved combination proportioning, diverter, and shut-off valve.

The present application is a continuation of my co-pending application Serial No. 52,867 filed August 30, 1960, now abandoned, and entitled Combination Proportioning, Diverter, and Shut-off Valve.

An illustrative use of the present valve is in a combination shower-tub installation. In this use, the valve may be adjusted to direct water to either the tub or shower as well as to control the temperature and volume of the water flowing to the tub or shower, as the case may be. The valve may also be set in a closed position in which water flow to both the tub and shower is cut off. Other uses of the valve are possible, of course.

With this preliminary discussion in mind, a general object of the invention may be stated as being the provision of a new and improved combination proportioning, diverter, and shut-off valve.

A more specific object of the invention is to provide a combination valve of the character described which is characterized by its relative simplicity, few number of parts, ease of operation, compact construction, simplicity of installation, and relatively low cost of manufacture.

Another object of the invention is to provide a combination valve of the character described in which proportioning, volume control, and shut-off are accomplished by manipulation of one member of the valve and diverter action is accomplished by manipulation of a second member of the valve.

An important object of the invention is to provide a unique valve construction in which the wearable parts may be easily removed for repair or replacement.

Other objects, advantages, and features of the invention will become readily apparent as the description proceeds.

A presently preferred embodiment of the invention will now be described in detail by reference to the attached drawings, in which:

FIG. 4 is a view similar to FIG. 2 showing the valve in its open position;

FIG. 5 is a section taken along line 5—5 of FIG. 4;

FIG. 6 is a partial section similar to FIG. 5 illustrating the proportioning action of the valve; and FIG. 7 is a section taken along line 7—7 of FIG. 4.

Figure 2:
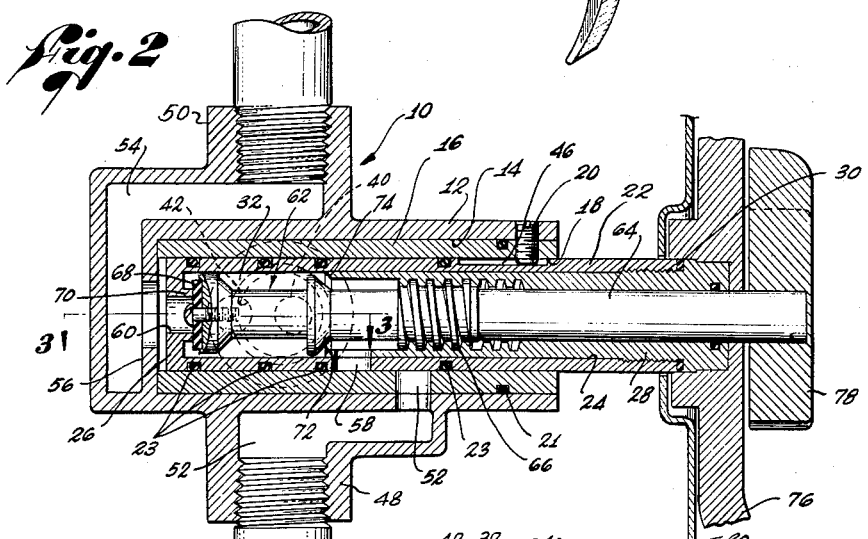
FIG. 2 is a longitudinal section through the valve showing the latter in its closed position.

The combination valve 10 illustrated in these drawings comprises a generally cylindrical body 12 having an axial bore 14 which is open at its right-hand end, as the valve is viewed in FIGS. 2 and 4. Fitted in this bore is a removable liner 16 defining a second bore 18 in the valve body. Liner 16 is held in position by a set screw 20 and is sealed to the valve body by a seal ring 21.

Slidably and rotatably received in and extending through the open end of bore 18 is a hollow, cylindrical proportioning and shut-off barrel 22. Seal rings 23 are placed, as shown, to slidably seal the barrel to the liner 16. Barrel 22 has an open outer end and an end wall 26 at its inner end.

Threaded in the open end of the barrel is a bearing 28. A seal ring 30 is placed, as shown, to seal the bearing to the barrel. The inner end of bearing 28 terminates short of end wall 26 so as to define a mixing chamber 32 in the inner end of the barrel.

Formed on the valve body 12 are two coaxial, diametrically opposed bosses 34 and 36 having coaxial hot and cold water inlet passages 38 and 40, respectively. These passages open through liner 16 into the bore 18 therein. The side wall of the barrel, about the chamber 32, is provided with a pair of inlet openings or ports 42 and 44 to the chamber. These ports are located between a pair of the seal rings 23 on the barrel and are angularly disposed as shown best in FIGS. 6 and 7.

In the axial position of the barrel shown in FIGS. 4–6, the barrel ports 42 and 44 are in the same transverse plane of the valve body as the hot and cold water inlets 38 and 40. In the rotary position of the valve shown in FIG. 6, the ports partially register with the inlets 38 and 40 so as to admit hot and cold water to chamber 32 in equal proportions. When the barrel is rotated in the counterclockwise direction from the position of FIG. 6, the cold water inlet 40 of the valve is gradually closed and the hot water inlet 38 is gradually opened to increase the temperature of the water in the mixing chamber 32. Similarly, when the barrel is rotated in the clockwise direction from the position of FIG. 6 to the position of FIG. 5, the hot water inlet of the valve is gradually closed and the cold water inlet is gradually opened to decrease the temperature of the water in the mixing chamber. Rotation of the barrel in the bore 18, therefore, provides a proportioning action.

Figure 3:
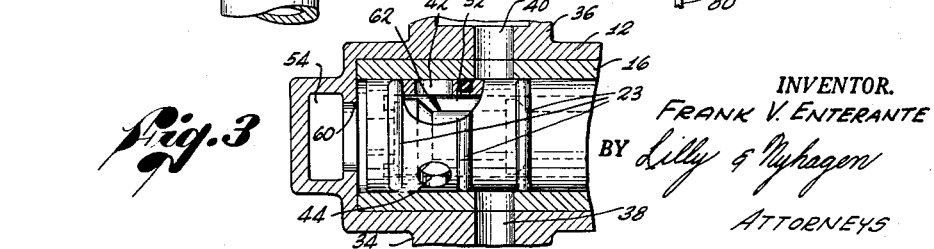
FIG. 3 is a section taken along line 3—3 of FIG. 2.

Inward movement of the barrel 22 from the position of FIG. 4 toward the positions of FIGS. 2 and 3 gradually and equally closes both inlets 38 and 40 of the valve to reduce the rate of water flow to the mixing chamber while retaining the water temperature substantially constant. In the position of the barrel shown in FIG. 3, both the hot and cold water inlets 38 and 40 are closed so that the flow of water to the mixing chamber 32 is completely cut off. Axial movement of the barrel 22, therefore, affords both a volume control action and a shut-off action.

The barrel is limited both in axial and rotational movement in its bore 18, to the limiting positions just described, by the set screw 20 which engages in a slot 46 in the barrel.

Formed on the valve body are a second pair of coaxial, diametrically opposed bosses 48 and 50 having a tub outlet passage 52 and a shower outlet passage 54. The tub outlet passage 52 opens through the liner 16 into its internal bore 18 at a point some distance from the end wall 56 of the bore 14. The shower outlet passage 54 opens axially through this end wall, as shown.

The barrel 22 has a side wall opening or port 58 which registers with the tub outlet 52 in the barrel position of FIG. 4. This port is circumferentially elongated to maintain communication between the port and tub outlet 52 during rotation adjustment of the barrel to effect the proportioning action described earlier. The barrel 22 also has an axial outlet opening or port 60 from the mixing chamber 32 in its end wall 26. This port is in constant communication with the shower outlet 54.

Axially movable within the mixing chamber 32 of the barrel is a diverter valve 62. Diverter 62 has a stem 64 which extends slidably and rotatably through the bearing 28 in the barrel and terminates beyond the end of the bearing and barrel, as shown. Interengaging threads 66 on the valve stem and bearing serve to axially move the diverter when the stem is rotated.

Fixed to the inner end of the diverter 62 is a washer 68 which engages an annular valve seat 70 about the barrel outlet port 60 in the position of the diverter shown in FIG. 2 and in solid lines in FIG. 4. This seals the barrel outlet port and cuts off water flow from the mixing chamber 32 to the shower outlet 54 of the valve. The diverter has an intermediate valve shoulder 72 which seats against a valve seat 74, formed by the inner end of the valve stem bearing 28, when the diverter occupies its phantom line position of FIG. 4. In this position of the diverter valve, water flow from the mixing chamber 32 to the tub outlet 52 of the valve is cut off. With the barrel in the "open" position of FIG. 4, then, a diverter action, to direct water from the mixing chamber to either the tub outlet 52 or shower outlet 54 of the valve is achieved by rotating the stem 64 to axially move the diverter to either of its two positions just mentioned.

Figure 1:
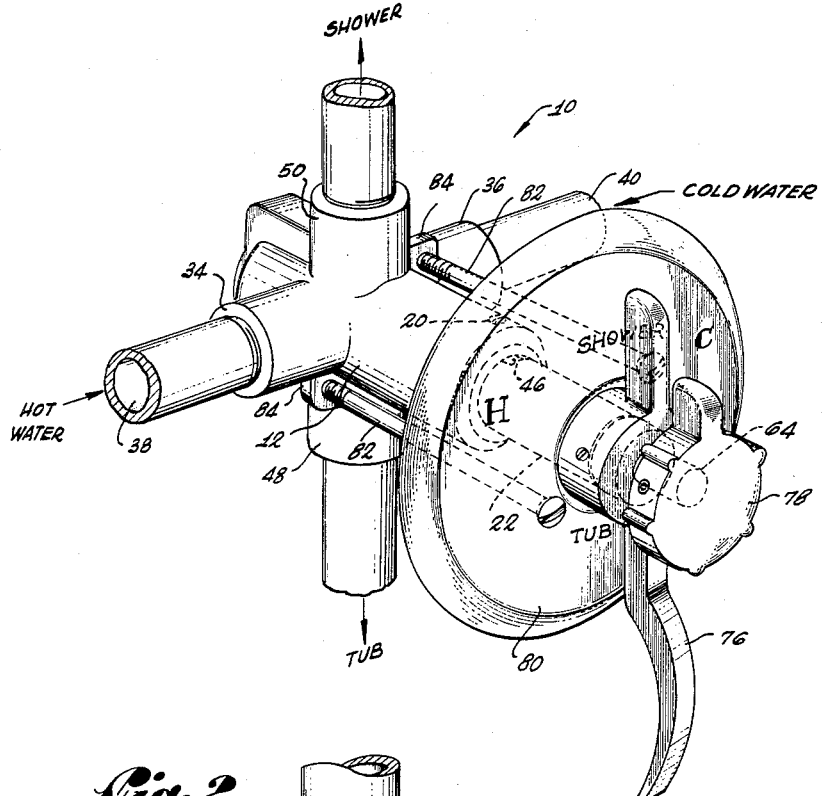
FIG. 1 is a perspective view of the present combination valve.

The barrel 22 is rotated as well as shifted axially, to proportion and control the rate of water flow to the mixing chamber 32, by means of a handle 76 fixed to the outer end of the barrel. Similarly, the diverter valve stem 64 is rotated, to axially shift the diverter valve for a diverter action, by means of a handle 78 fixed to the outer end of the stem. A plate 80, secured by screws 82 to lugs 84 on the valve body, is located behind the valve handles and bears the legends shown in FIG. 1 defining the various valve handle positions.

Operation of the combination valve is believed to be obvious from the preceding description. Thus, assuming the valve barrel 12 to be in its "off" position of FIG. 2, the handle 78 of the diverter 62 is first manipulated to shift the latter to either the tub position or the shower position as desired. The valve is then turned on by grasping handle 76 and pulling it to shift the barrel 22 to its "on" position of FIG. 4. In this position, of course, the water inlet openings 42 and 44 in the barrel are aligned with the hot and cold water inlets 38 and 40 on the valve body to admit hot and cold water to the mixing chamber 32. Also, the barrel tub outlet port 58 registers with the tub outlet 52 in the valve body so that water flows from the mixing chamber to either the tub outlet 52 or shower outlet 54 of the valve depending on the setting of the diverter 62. The barrel can now be rotated to proportion the hot and cold water to obtain the desired mixed water temperature. The valve is shut off, of course, by simply grasping the valve handle 76 and pushing the barrel 22 to its "off" position of FIG. 2.

A highly important feature of the invention resides in the fact that the liner 16, barrel 22, and diverter 62 may be quickly and easily removed for repair or replacement by releasing the set screw 20. Thus, the present valve is uniquely designed for quick and easy reconditioning when necessary.

Clearly, therefore, the valve herein illustrated and described is fully capable of attaining the objects and advantages preliminarily set forth.

Numerous modifications in the design and arrangement of parts of the invention are, of course, possible within the spirit and scope of the following claims.

I claims:

1. A valve comprising a body having a bore, a barrel slidable in said bore and having an internal chamber, said body having a fluid inlet and said barrel having a first port which registers with said inlet in one axial position of the barrel to admit fluid to said chamber and which is displaced from said inlet in another axial position of the barrel to cut off fluid flow to said chamber, said body having two fluid outlets, second ports in said barrel opening to said chamber and communicating with said outlets, respectively, when said barrel is in said one position, diverter valve means in said barrel for selectively closing said second ports, a handle on said barrel, and a handle on said diverter valve means.

2. A value comprising a body having a bore, a barrel slidable in said bore having an internal chamber, said body having a fluid inlet and said barrel having a first port which registers with said inlet in one axial position of the barrel to admit fluid to the chamber and which is displaced from the inlet in another axial position of the barrel to cut off flow of fluid to the chamber, said body having a pair of outlets and said barrel having a pair of second ports opening to said chamber and communicating with said outlets, respectively, in said one position of the barrel, internal valve seats in said barrel about said second ports, respectively, a diverter valve within the barrel movable between a first position of seating engagement with one valve seat and a second position of seating engagement with the other valve seat for selectively communicating said chamber to either outlet, a handle on said diverter valve exteriorly of the valve body for operating the diverter valve, and a handle on said barrel exteriorly of the valve body for operating the barrel.

3. The subject matter of claim 2 wherein said valve seats are coaxially disposed in said barrel and said diverter valve is movably axially in the barrel into seating engagement with said valve seats.

4. A valve comprising a body having a bore, a barrel removably fitted in said bore, whereby said barrel is removable from said body for repair and replacement, means releasably securing said barrel in said bore, said barrel having an internal chamber, said body having an inlet communicating with said chamber through a first port and two outlets communicating with said chamber through second ports, respectively, in said barrel, a first internal valve seat in said barrel about one of said second ports, a second internal valve seat in said barrel about the other second port, a diverter valve in said barrel selectively movable into seating engagement with said valve seats to close either second port, and a handle on said diverter valve exteriorly of said body for operating said diverter valve.

5. A valve comprising a body having a bore opening at one end to the outside of the body, a barrel slidable in and extending at one end through the open end of said bore, said one end of the barrel being open and an end wall extending across the other end of said barrel, a bearing fixed in the open end of said barrel and terminating short of said end wall to define an internal chamber in the barrel, said valve body having an inlet opening through the side wall of said bore and the wall of said barrel having a first port which registers with said inlet in one axial position of the barrel to admit fluid to the chamber and which is displaced from said inlet in another axial position of the barrel to cut off flow of fluid to said chamber, said valve body having a first outlet opening to the other end of said bore and a second outlet opening through the side wall of said bore, said barrel having a second port in said end wall thereof which communicates with said first outlet and a third port in the side wall of the barrel which registers with said second inlet in said one position of the barrel, a diverter valve in said chamber having a stem extending through said bearing to the outside of said barrel, interengaging threads on said stem and bearing for axially moving the diverter valve in said chamber when the stem is rotated, a first internal valve seat in said barrel about said second port and a second internal valve seat in said barrel about said third port with which said diverter valve is selectively engageable by rotation of the valve stem to selectively close said second and third ports, means for limiting axial movement of the barrel, a handle on said one end of the barrel for moving the latter, and a handle on the outer end of said valve stem for moving said diverter valve.

6. The subject matter of claim 1 wherein said valve body has a removable liner defining said bore in which the barrel moves.

7. A valve comprising a body having a bore, a barrel slidable and rotatable in said bore and having an internal mixing chamber, said body having a first inlet and a second inlet and said barrel having ports which register with said inlets, respectively, in one axial position and one angular position of the barrel in said bore to admit fluids from said inlets to said chamber in substantially equal proportions, said barrel being axially movable from said one axial position to simultaneously adjust and cut off the flow of fluids from said inlets to said chamber and said barrel being rotatable from said one angular position to proportion flow of fluids from said inlets to said chamber, said body having an outlet communicating with said chamber, a handle on said barrel for rotating and axially moving the same, and valve means including a valve seat in said barrel for controlling flow from said chamber to said outlet.

8. A valve comprising a body having a bore, a barrel slidable and rotatable in said bore and having an internal mixing chamber, said valve body having a first inlet and a second inlet and said barrel having two ports which register with said inlets, respectively, in one angular position and one axial position of the barrel to admit fluids from said inlets to said chamber in substantially equal proportions, said barrel being rotatable from said one angular position to proportion the flow of fluids from said inlet to said chamber and being axially movable from said one axial position to simultaneously adjust and completely cut off flow of fluids from said inlets to said chamber, said valve body having two outlets, ports in said barrel opening to said chamber and communicating with said outlets, respectively, when the barrel is in said one axial position, diverter valve means in the barrel for selectively closing said latter ports, and handle means for operating said barrel and diverter valve.

References Cited by the Examiner

UNITED STATES PATENTS

| 920,914 | 5/1909 | Christ | 137—614.07 X |
| 2,582,370 | 1/1952 | Albrecht | 137—637.4 XR |

FOREIGN PATENTS 1,029,638  5/1958  Germany.

ISADOR WEIL, *Primary Examiner.*

WILLIAM F. O'DEA, *Examiner.*